(12) United States Patent　　　　(10) Patent No.:　US 12,650,996 B2
Niu et al.　　　　　　　　　　　　　(45) Date of Patent:　　　Jun. 9, 2026

(54) SERVER AND METHOD FOR PROCESSING REQUEST FOR SEARCH FOR ON-DEMAND SERVICE

(71) Applicant: GRABTAXI HOLDINGS PTE. LTD., Singapore (SG)

(72) Inventors: Junpeng Niu, Singapore (SG); Hang Shang, Singapore (SG); Weicheng Zhu, Singapore (SG); Wenqing Chen, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 4 days.

(21) Appl. No.: 18/839,143

(22) PCT Filed: Feb. 23, 2023

(86) PCT No.: PCT/SG2023/050110
　　　§ 371 (c)(1),
　　　(2) Date: Aug. 16, 2024

(87) PCT Pub. No.: WO2023/191708
　　　PCT Pub. Date: Oct. 5, 2023

(65) Prior Publication Data
　　　US 2025/0181593 A1　　　Jun. 5, 2025

(30) Foreign Application Priority Data
　　　Apr. 1, 2022　　(SG) ............................. 10202203329S

(51) Int. Cl.
　　　*G06F 16/2457*　　　(2019.01)
　　　*G06F 16/9537*　　　(2019.01)
　　　(Continued)

(52) U.S. Cl.
　　　CPC ..... *G06F 16/24578* (2019.01); *G06F 16/9537* (2019.01); *G06Q 10/083* (2013.01); *H04L 67/52* (2022.05); *H04W 4/02* (2013.01)

(58) Field of Classification Search
　　　CPC .......... G06F 16/24578; G06F 16/9537; G06Q 10/083; H04L 67/52; H04W 4/02
　　　See application file for complete search history.

(56) References Cited

U.S. PATENT DOCUMENTS

2019/0132699 A1　　5/2019　Nikulkov et al.
2021/0082074 A1　　3/2021　Lye et al.
2021/0319378 A1　10/2021　Wang

FOREIGN PATENT DOCUMENTS

EP　　　　3252705 A1　　12/2017

OTHER PUBLICATIONS

Ma Z, Koutsopoulos HN. Near-on-demand mobility. The benefits of user flexibility for ride-pooling services. Transportation Research Part C: Emerging Technologies. Feb. 1, 2022;135:103530. (Year: 2022).*

(Continued)

*Primary Examiner* — Jay A Morrison
(74) *Attorney, Agent, or Firm* — Maschoff Brennan

(57)　　　　ABSTRACT

Aspects concern a server configured to receive a request for a search, determine a distance from a location of a computing device to produce a first list of service providers within the distance, rank the first list of service providers based on a plurality of predetermined first factor values including a predicted delivery experience value of each service provider in the first list of service providers, produce a second list of service providers from the first list of service providers based on the rank of each service provider in the first list of service providers, determine whether to filter out a part of the second list of service providers based on a size of the second list of service providers, and filter out the part of the (Continued)

(A)

(B)

second list of service providers based on the predicted delivery experience value of each service provider in the second list of service providers.

20 Claims, 6 Drawing Sheets

(51) Int. Cl.
  *G06Q 10/083*  (2024.01)
  *H04L 67/52*  (2022.01)
  *H04W 4/02*  (2018.01)

(56)  References Cited

OTHER PUBLICATIONS

International Search Report and Written Opinion dated Oct. 10, 2023 with was issued in connection with PCT/SG2023/050110.

* cited by examiner

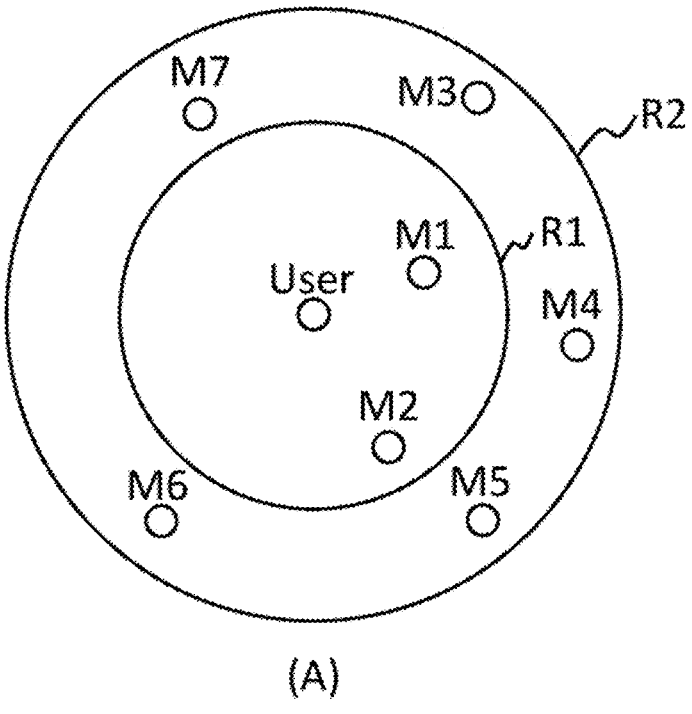
(A)
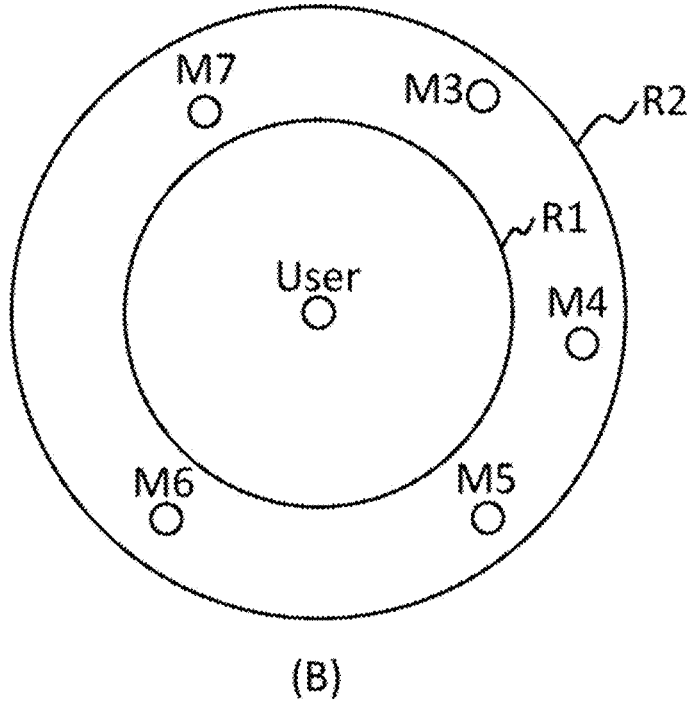
(B)
FIG. 1

100

Memory
130

Processor
120

Communication
Interface
110

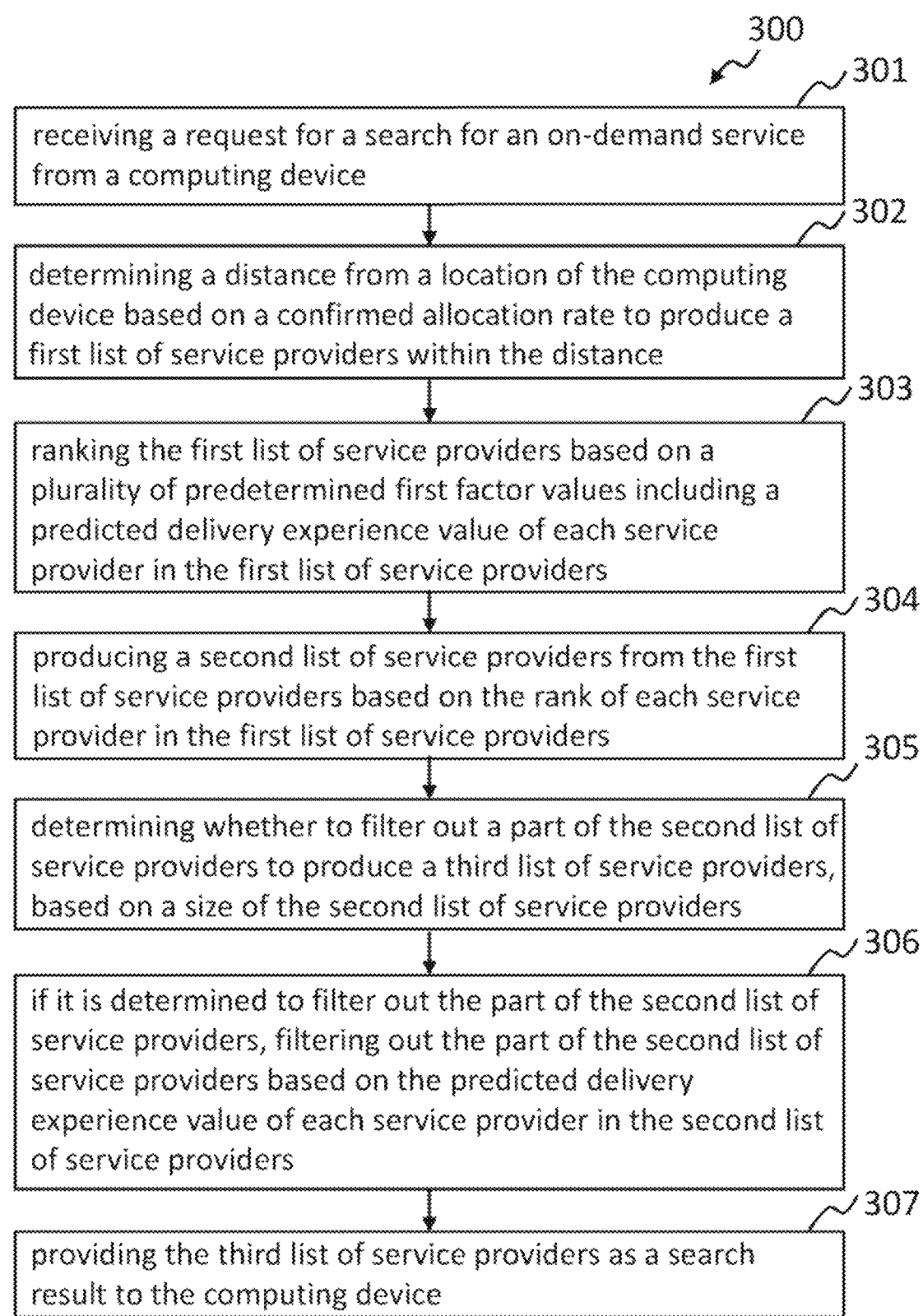

300

301 receiving a request for a search for an on-demand service from a computing device

302 determining a distance from a location of the computing device based on a confirmed allocation rate to produce a first list of service providers within the distance

303 ranking the first list of service providers based on a plurality of predetermined first factor values including a predicted delivery experience value of each service provider in the first list of service providers

304 producing a second list of service providers from the first list of service providers based on the rank of each service provider in the first list of service providers

305 determining whether to filter out a part of the second list of service providers to produce a third list of service providers, based on a size of the second list of service providers

306 if it is determined to filter out the part of the second list of service providers, filtering out the part of the second list of service providers based on the predicted delivery experience value of each service provider in the second list of service providers

307 providing the third list of service providers as a search result to the computing device

FIG. 4

SERVER AND METHOD FOR PROCESSING REQUEST FOR SEARCH FOR ON-DEMAND SERVICE

This application is a US National Stage Application pursuant to 35 USC 371 claiming benefit of and priority to International Application No. PCT/SG2023/050110, filed on Feb. 23, 2023, and claiming priority to Singapore Application No. 10202203329S filed on Apr. 1, 2022, each of which are hereby incorporated by reference herein in its entirety.

TECHNICAL FIELD

Various embodiments relate to a server and a method for processing a request for a search for an on-demand service.

BACKGROUND

Due to development of information technology, a user may request an on-demand service using a computing device. The on-demand service may allow the user to fulfil the user's demand via an immediate access to goods and/or services. The user may request the on-demand service, such as a delivery service or a transport service, using a user interface presented on the computing device.

As an example, the user may request a search for the on-demand service, for example, a food delivery order, using the computing device. A server providing the on-demand service may then aggregate locations of available service providers (e.g. restaurants), types of services available (e.g. foods), estimated fees and other information, and provide the aggregated information to the computing device, so that the user can make selections on the user interface presented on the computing device. Once the user makes the selections on the user interface, the server may allocate a service contractor (e.g. driver) among a plurality of service contractors to deliver the selected food from the selected restaurant to the user.

While the demand for the on-demand service swings heavily from time to time, the number of the plurality of service contractors may tend to remain relatively constant. For example, during peak hours (for example, lunch time and dinner time), the demand may surpass a supply level by far. Conventionally, as a solution, on-demand service platforms may batch multiple orders to fulfil the demand as much as possible. As another solution, the on-demand service platforms may use a combination of a reduced delivery radius and a delivery fee surge. The delivery radius may be reduced based on a confirmed allocation rate of a plurality of orders received in a region where the user is located in. If the confirmed allocation rate is low, the on-demand service platforms may reduce the delivery radius to control a visibility of the service providers, in order to allow only a short distance delivery. The delivery fee surge may curb an excessive demand.

However, the above-mentioned solutions may dampen the demand, instead of shaping the demand. The delivery fee surge may directly drive away the demand. The reduced delivery radius may reduce a visibility of the service providers to the user. FIG. 1 illustrates examples of reduced delivery radius for a request for a search for the on-demand service according to a conventional technology. As shown in FIG. 1, during the peak hours, the delivery radius may be reduced from a radius 2 (R2) to a radius 1 (R1) to dampen the demand by showing less service providers to the users. For example, as shown in FIG. 1(A), when the delivery radius is the radius 2 (R2), a first to a seventh service providers (M1 to M7) are shown to the user. However, as the delivery radius is reduced to the radius 1 (R1), only a part of service providers (M1 and M2) is shown to the user. Even though the reduced delivery radius may help a demand fulfilment rate at a certain level, it may affect a user experience, as qualities of the service providers inside the reduced delivery radius may not satisfy the user's expectation. For example, the service providers inside the reduced delivery radius may not have a good historical delivery experience value. In addition, the user may only observe very few service providers, or even no service providers, when the user wants to order foods. For example, as shown in FIG. 1(B), when the delivery radius is the radius 2 (R2), a third to a seventh service providers (M3 to M7) are shown to the user. However, as the delivery radius is reduced to the radius 1 (R1), no service provider is shown to the user. As a result, the user may not order the foods from a current on-demand service platform, and then move to another on-demand service platform.

Therefore, there is a need to provide a solution for processing the request for the search for the on-demand service without dampening the demand.

SUMMARY

According to various embodiments, there is a server for processing a request for a search for an on-demand service. The server comprises: a communication interface configured to receive the request for the search for the on-demand service from a computing device; and a processor connectable to the communication interface to receive the request for the search, and configured to determine a distance from a location of the computing device based on a confirmed allocation rate of a plurality of requests for on-demand services received from a plurality of users, to produce a first list of service providers within the distance. The processor is configured to rank the first list of service providers based on a plurality of predetermined first factor values including a predicted delivery experience value of each service provider in the first list of service providers, produce a second list of service providers from the first list of service providers based on the rank of each service provider in the first list of service providers, and determine whether to filter out a part of the second list of service providers to produce a third list of service providers, based on a size of the second list of service providers. If the processor determines to filter out the part of the second list of service providers, the processor is configured to filter out the part of the second list of service providers based on the predicted delivery experience value of each service provider in the second list of service providers to produce the third list of service providers, and provide the third list of service providers as a search result to the computing device via the communication interface.

In some embodiments, the processor is configured to filter out a part of the first list of service providers based on the rank of each service provider in the first list of service providers, to produce the second list of service providers.

In some embodiments, the processor is configured to rank the second list of service providers based on a plurality of predetermined second factor values, and produce the third list of service providers from the second list of service providers based on the rank of each service provider in the second list of service providers.

In some embodiments, if the size of the second list of service providers is less than a predetermined size, the processor is configured to determine not to filter out the part of the second list of service providers to produce the third list of service providers.

In some embodiments, if the size of the second list of service providers is same as or greater than the predetermined size, the processor is configured to determine to filter out the part of the second list of service providers based on the rank of each service provider in the second list of service providers, to produce the third list of service providers.

In some embodiments, if the size of the second list of service providers is same as or greater than the predetermined size, the processor is configured to filter out at least one service provider which has the predicted delivery experience value lower than a predetermined minimum threshold of the predicted delivery experience value.

In some embodiments, if the size of the second list of service providers is same as or greater than the predetermined size, the processor is configured not to filter out at least one service provider which has the predicted delivery experience value higher than a predetermined maximum threshold of the predicted delivery experience value.

In some embodiments, the plurality of predetermined first factor values further includes at least one of a revenue, a profit, a type, and a searching matching score of each service provider in the first list of service providers.

In some embodiments, the plurality of predetermined second factor values includes at least one of a surge, an estimated time of arrival, a revenue, a profit, and a type of each service provider in the second list of service providers.

In accordance with various embodiments, there is a method for processing a request for a search for an on-demand service, the method comprising: receiving the request for the search for the on-demand service from a computing device; determining a distance from a location of the computing device based on a confirmed allocation rate of a plurality of requests for on-demand services received from a plurality of users, to produce a first list of service providers within the distance; ranking the first list of service providers based on a plurality of predetermined first factor values including a predicted delivery experience value of each service provider in the first list of service providers; producing a second list of service providers from the first list of service providers based on the rank of each service provider in the first list of service providers; determining whether to filter out a part of the second list of service providers to produce a third list of service providers, based on a size of the second list of service providers; and if it is determined to filter out the part of the second list of service providers, filtering out the part of the second list of service providers based on the predicted delivery experience value of each service provider in the second list of service providers, to produce the third list of service providers; and providing the third list of service providers as a search result to the computing device.

In some embodiments, the method further comprises: filtering out a part of the first list of service providers based on the rank of each service provider in the first list of service providers, to produce the second list of service providers.

In some embodiments, the method further comprises: ranking the second list of service providers based on a plurality of predetermined second factor values; and producing the third list of service providers from the second list of service providers based on the rank of each service provider in the second list of service providers.

In some embodiments, the method further comprises: if the size of the second list of service providers is less than a predetermined size, determining not to filter out the part of the second list of service providers to produce the third list of service providers.

In some embodiments, the method further comprises: if the size of the second list of service providers is same as or greater than the predetermined size, determining to filter out the part of the second list of service providers based on the rank of each service provider in the second list of service providers, to produce the third list of service providers.

In some embodiments, if the size of the second list of service providers is same as or greater than the predetermined size, at least one service provider which has the predicted delivery experience value lower than a predetermined minimum threshold of the predicted delivery experience value is filtered out.

In some embodiments, if the size of the second list of service providers is same as or greater than the predetermined size, at least one service provider which has the predicted delivery experience value higher than a predetermined maximum threshold of the predicted delivery experience value is not filtered out.

In some embodiments, the plurality of predetermined first factor values further includes at least one of a revenue, a profit, a type, and a searching matching score of each service provider in the first list of service providers.

In some embodiments, the plurality of predetermined second factor values includes at least one of a surge, an estimated time of arrival, a revenue, a profit, and a type of each service provider in the second list of service providers.

According to various embodiments, a data processing apparatus configured to perform the method of any one of the above embodiments is provided.

According to various embodiments, a computer program element comprising program instructions, which, when executed by one or more processors, cause the one or more processors to perform the method of any one of the above embodiments is provided.

According to various embodiments, a computer-readable medium comprising program instructions, which, when executed by one or more processors, cause the one or more processors to perform the method of any one of the above embodiments is provided. The computer-readable medium may include a non-transitory computer-readable medium.

BRIEF DESCRIPTION OF THE DRAWINGS

The invention will be better understood with reference to the detailed description when considered in conjunction with the non-limiting examples and the accompanying drawings, in which:

FIG. 1 illustrates examples of reduced delivery radius for a request for a search for an on-demand service according to a conventional technology.

FIG. 4 illustrates a flow diagram for a method for processing a request for a search for an on-demand service according to various embodiments.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of a server and a method are analogously valid for the other server and method. Similarly, embodiments described in the context of a server are analogously valid for a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

Throughout the description, the term "module" may be understood as an application specific integrated circuit (ASIC), an electronic circuit, a combinational logic circuit, a field programmable gate array (FPGA), a processor which executes code, other suitable hardware components which provide the described functionality, or any combination thereof. The term of "module" may include a memory which stores code executed by the processor.

In the following, embodiments will be described in detail.

Figure 2:
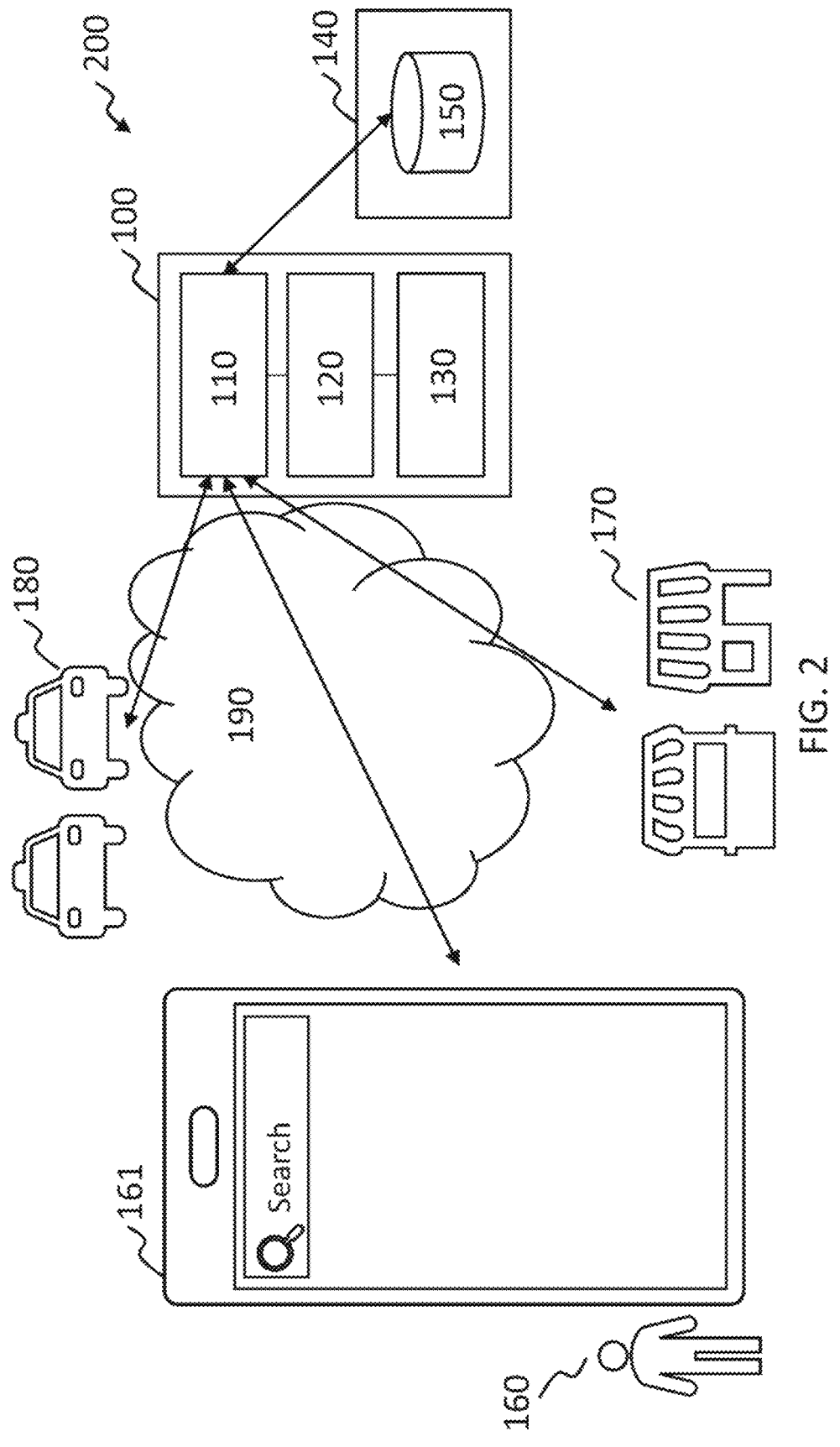
FIG. 2 illustrates an infrastructure of a system including a server for processing a request for a search for an on-demand service according to various embodiments.

FIG. 2 illustrates an infrastructure of a system 200 including a server 100 for processing a request for a search for an on-demand service according to various embodiments.

As shown in FIG. 2, the system 200 may include, but is not limited to, the server 100, a database system 140, a computing device 161, one or more external devices 170, 180, and a network 190.

In some embodiments, the on-demand service may be a service allowing a user 160 to fulfil the user's demand via an immediate access to goods and/or services. The user 160 may request the search for the on-demand service, such as a delivery service or a transport service, using a user interface presented on the computing device 161.

In some embodiments, the network 190 may include, but is not limited to, a Local Area Network (LAN), a Wide Area Network (WAN), a Global Area Network (GAN), or any combination thereof. The network 190 may provide a wireline communication, a wireless communication, or a combination of the wireline and wireless communication between the server 100 and the computing device 161, and between the server 100 and the one or more external devices 170, 180, for example, service provider devices 170 and service contractor devices 180.

In some embodiments, the computing device 161 may be connectable to the server 100 via the network 190. In some embodiments, the computing device 161 may be arranged in data or signal communication with the server 100 via the network 190. In some embodiments, the computing device 161 may include, but is not limited to, at least one of the following: a mobile phone, a tablet computer, a laptop computer, a desktop computer, a head-mounted display and a smart watch. In some embodiments, the computing device 161 may belong to the user 160. Although not shown, in some embodiments, the system 200 may further include a plurality of computing devices each belonging to a plurality of users. In some embodiments, the user 160 and the plurality of users may be customers who request for the on-demand service, for example, food delivery.

In some embodiments, the computing device 161 may include a location sensor. In some embodiments, the location sensor may communicate with at least one of a global positioning satellite (GPS) server, a network server, and a Wi-Fi server, to detect a location of the computing device 161. In some embodiments, the computing device 161 may generate information about the location of the computing device 161.

In some embodiments, the server 100, for example, implemented by a server computer, may include a communication interface 110, a processor 120, and a memory 130 (as will be described with reference to FIG. 3).

In some embodiments, the server 100 may communicate with the computing device 161 via the network 190. In some embodiments, the computing device 161 may receive a request from the user 160 for a search for the on-demand service. The computing device 161 may send the request to the server 100 via the network 190. In some embodiments, the computing device 161 may send the information about the location of the computing device 161 to the server 100 via the network 190.

In some embodiments, the server 100 may receive the request with the information about the location of the computing device 161. The server 100 may then determine a distance from the location of the computing device 161 (also referred to as a "delivery radius"), to produce a list of service providers within the distance. In some embodiments, the server 100 may aggregate locations of available service providers (e.g. restaurants), types of services available (e.g. foods), estimated fees, and other information, and provide the aggregated information to the computing device 161 via the network 190, so that the user 160 can make selections on the user interface presented on the computing device 161.

In some embodiments, the system 200 may further include a database 150. In some embodiments, the database 150 may be a part of the database system 140 which may be external to the server 100. The server 100 may communicate with the database 150. In some other embodiments, although not shown, the database 150 may be implemented locally in the memory 130 of the server 100.

In some embodiments, the server 100 may communicate with the external device 170, for example, the service provider device 170, via the network 190. The service provider device 170 may belong to a service provider. The service provider may include, is not limited to, a restaurant, a cafe, a store, and a merchant, which can provide goods and/or services, for example, foods. In some embodiments, the server 100 may receive the request with the information about the location of the computing device 161, and then determine the delivery radius to produce the list of service providers within the delivery radius. In some embodiments, the server 100 may communicate with the service provider device 170 to check the service provider's availability. In some embodiments, the server 100 may communicate with the service provider device 170 to aggregate information including, but not limited to, a location of the service provider, a type of services available, estimated fees, and other information, in order to produce the list of service providers within the delivery radius. In some embodiments, the computing device 161 may display the list of service providers with the aggregated information on the user interface. In some embodiments, after the user 160 makes selections on the user interface for the request for the on-demand service, for example, by selecting a service provider and a food, the server 100 may communicate with the selected service provider (for example, the service provider device 170) to prepare the selected food.

In some embodiments, the server 100 may communicate with the external device 180, for example, the service contractor device 180, via the network 190. The service contractor device 180 may belong to a service contractor. The service contractor may include, but is not limited to, a driver, that can provide a delivery service from a first location, for example, the location of the selected service provider, to a second location, for example, the location of the user 160. In some embodiments, after the user 160 makes selections for the request for the on-demand service, for example, by selecting the service provider and the food, using the computing device 161, the server 100 may allocate a service contractor among a plurality of service contractors to deliver the selected food from the selected service provider to the user 160.

Figure 3:
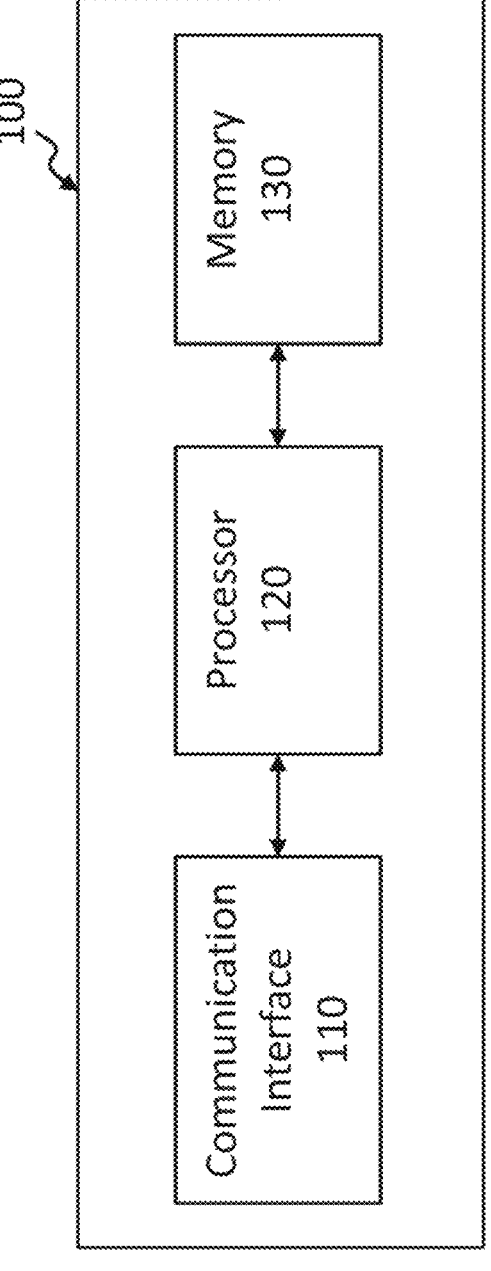
FIG. 3 illustrates a block diagram of a server for processing a request for a search for an on-demand service according to various embodiments.

FIG. 3 illustrates a block diagram of a server 100 for processing a request for a search for an on-demand service according to various embodiments.

As shown in FIG. 3, the server 100, for example, implemented by a server computer, may include a communication interface 110, a processor 120, and a memory 130.

In some embodiments, the memory 130 (also referred to as a "database") may store input data and/or output data temporarily or permanently. In some embodiments, the memory 130 may store program code which allows the server 100 to perform a method 300 (as will be described with reference to FIG. 4). In some embodiments, the program code may be embedded in a Software Development Kit (SDK). The memory 130 may include an internal memory of the server 100 and/or an external memory. The external memory may include, but is not limited to, an external storage medium, for example, a memory card, a flash drive, and a web storage.

In some embodiments, the communication interface 110 may allow one or more computing devices, including a computing device 161, to communicate with the processor 120 of the server 100 via a network 190, as shown in FIG. 2. In some embodiments, as shown in FIG. 2, the computing device 161 may belong to a user 160 who wants to request for the on-demand service. In some embodiments, the communication interface 110 may transmit signals to the computing device 161, and/or receive signals from the computing device 161 via the network 190.

In some embodiments, the communication interface 110 may allow one or more external devices 170, 180, for example, a service provider device 170 and a service contractor device 180, to communicate with the processor 120 of the server 100 via the network 190, as shown in FIG. 2. In some embodiments, the communication interface 110 may transmit signals to the external devices 170, 180 and/or receive signals from the external devices 170, 180 via the network 190.

In some embodiments, the communication interface 110 may receive a request for a search for the on-demand service from the computing device 161 via the network 190. The communication interface 110 may then send the request for the search for the on-demand service to the processor 120.

In some embodiments, the communication interface 110 may further receive information about a location of the computing device 161 from the computing device 161 via the network 190. The communication interface 110 may then send the information about the location of the computing device 161 to the processor 120.

In some embodiments, the communication interface 110 may receive concurrently the request for the search and the information about the location of the computing device 161 from the computing device 161 via the network. In some other embodiments, the communication interface 110 may receive the request for the search first, and subsequently receive the information about the location of the computing device 161, from the computing device 161 via the network 190.

In some embodiments, the communication interface 110 may communicate with the service provider device 170 of the service provider, to check an availability of the service provider and to collect information which may be needed to produce a list of service providers. In some embodiments, the communication interface 110 may communicate with the service provider device 170 to provide a search result as per the user's request for the search for the on-demand service. In some embodiments, the communication interface 110 may communicate with the service provider device 170 to provide the on-demand service as per the user's subsequent request for a certain on-demand service. In some embodiments, the communication interface 110 may communicate with the service contractor device 180 to deliver/transport the on-demand service, for example, the selected food, from the selected service provider to the user 160.

The processor 120 may include, but is not limited to, a microprocessor, an analogue circuit, a digital circuit, a mixed-signal circuit, a logic circuit, an integrated circuit, a Central Processing Unit (CPU), a Graphics Processing Unit (GPU), a Digital Signal Processor (DSP), a Field Programmable Gate Array (FPGA), an Application Specific Integrated Circuit (ASIC), or any combination thereof. Any other kind of implementation of the respective functions, which will be described below in further detail, may also be understood as the processor 120.

In some embodiments, the processor 120 may be connectable to the communication interface 110. In some embodiments, the processor 120 may be arranged in data or signal communication with the communication interface 110 to receive the request for the search and the information about the location of the computing device 161.

In some embodiments, the processor 120 may receive concurrently the request for the search and the information about the location of the computing device 161 from the communication interface 110. In some other embodiments, the processor 120 may receive the request for the search first, and subsequently receive the information about the location of the computing device 161 from the communication interface 110.

In some embodiments, the processor 120 may determine a distance from the location of the computing device (also referred to as a "delivery radius") based on a real time signals about a market, for example, a confirmed allocation rate (also referred to as a "CAR") of a plurality of requests for on-demand services (also referred to as "orders") received from a plurality of users in a region where the user 160 is located in, to produce a first list of service providers within the delivery radius. In some embodiments, the processor 120 may calculate the confirmed allocation rate of the plurality of orders received from the plurality of users in the region where the user 160 is located in during a certain period. In some embodiments, the processor 120 may obtain the number of allocated orders and the number of previous outstanding orders from an external server (not shown). The processor 120 may then obtain the confirmed allocation rate by dividing the number of allocated orders by a sum of the number of allocated orders and the number of previous outstanding orders. In some other embodiments, the processor 120 may obtain the confirmed allocation rate of the plurality of orders received from the plurality of users in the region where the user 160 is located in during a certain period, from an external server (not shown).

In some embodiments, the processor 120 may determine the delivery radius based on the confirmed allocation rate. For example, if the market has a limited supply and a high demand, the confirmed allocation rate may be decreased. If the confirmed allocation rate is decreased, the processor 120 may reduce the delivery radius to reduce a delivery scope. As another example, if the confirmed allocation rate is increased, the processor 120 may increase the delivery radius to increase the delivery scope.

In some embodiments, the processor 120 may determine the delivery radius based on the confirmed allocation rate and at least one optimised parameter. In some embodiments, the processor 120 may use parameters to control a relationship between the delivery radius and the confirmed allocation rate. In other words, the processor 120 may determine the delivery radius based on the parameters and the confirmed allocation rate. In some embodiments, the processor 120 may select at least one parameter from the parameters and optimise the selected parameter based on a historical performance. For example, the processor 120 may do the optimisation on a minimal radius configuration inside an automatic radius management system (ARM). The processor 120 may track a performance metric (e.g. FedX, conversion rate, revenue, etc.) at a different minimal radius, and apply a Bayesian optimisation to tune the minimal radius based on the performance metric. The processor 120 may then use the optimised parameter to determine the delivery radius.

In some other embodiments, the processor 120 may determine the delivery radius based on the confirmed allocation rate and a scaler. The processor 120 may use the scaler to control the delivery radius. In some embodiments, the processor 120 may optimise the scaler and use the optimised scaler to determine the delivery radius with the parameters in other levers (as will be described below). The scalar may be another type of control variables applied in the automatic radius management system. For example, after a final radius is calculated by the automatic radius management system, the scalar may be multiplied to the final radius to provide an enlarger radius or a reduced radius (based on the scalar value), which can be tuned through Optimus similar to the minimal radius described above.

In some embodiments, the processor 120 may rank the first list of service providers based on a plurality of predetermined first factor values including a predicted delivery experience value (also referred to as a "FedX") of each service provider in the first list of service providers (also referred to as a "default ranking" or an "initial ranking").

In some embodiments, the processor 120 may produce a second list of service providers from the first list of service providers based on the rank of each service provider in the first list of service providers. In some embodiments, the processor 120 may filter out a part of the first list of service providers based on the rank of each service provider in the first list of service providers, to produce the second list of service providers. For example, based on the rank of each service provider in the first list of service providers, top N (for example, N=100) service providers may be passed to a next round of ranking. In some embodiments, service providers ranked between N and 2N may also be selected to show to the user 160 in case the user 160 may not be interested in all the top N service providers.

In some embodiments, the predicted delivery experience value of each service provider may be a percentage of unique requests that were fulfilled at a first order and delivered within a predefined time threshold and with basket ETA (estimated time of arrival) promise kept. The basket ETA may refer to the estimated time from when an order is created to when the order is completed and delivered to the user (customer). In some embodiments, the delivery experience value of each service provider may be predicted based on a historical delivery experience value of each service provider, ETA performance, and real time signals such as the confirmed allocation rate. In some embodiments, the processor 120 may use a FedX prediction model to predict the delivery experience value of each service provider in the first list of service providers. In some embodiments, the plurality of predetermined first factor values may further include, but are not limited to, at least one of a revenue, a profit, a type, and a searching matching score of each service provider in the first list of service providers. For example, the type of each service provider may include a merchant type.

As the predicted delivery experience value of each service provider is used as a feature in the default ranking process, service providers with high predicted delivery experience value may be ranked higher and not be filtered out. In addition, as the plurality of predetermined first factor values are used in the default ranking process, service providers with low predicted delivery experience value may also be included in the second list of the service providers, if these service providers have higher values for other features.

In some embodiments, after obtaining the second list of service providers and the rank and/or score obtained from the default ranking process, the processor 120 may rank the service providers based on more features. In some embodiments, the processor 120 may rank the second list of service providers based on a plurality of predetermined second factor values (also referred to as a "final ranking" or a "sustainable ranking"), and produce a third list of service providers from the second list of service providers. In some embodiments, the plurality of predetermined second factor values includes at least one of a surge, an estimated time of arrival, a revenue, a profit, and a type of each service provider in the second list of service providers.

In some embodiments, the processor 120 may use a detailed FedX prediction model to filter the service providers based on the predicted delivery experience value of each service provider in the second list of service providers, to produce the third list of service providers. In some embodiments, in the default ranking process, the FedX prediction model may consider service provider (merchant) level features, while in the final ranking process, the FedX prediction model may consider the service provider (merchant) level features and the user (customer) level features (like the historical FedX in the customer's location). The processor 120 is able to find out the service providers with the high predicted delivery experience value to show these service providers to the user 160. As the processor 120 filters out service providers with low predicted delivery experience value to produce the third list of service providers instead of lowering the rank of these service providers, service providers with the high predicted delivery experience value may be included in the third list of the service providers, as the search result. As such, the user 160 may select a service provider with the high predicted delivery experience value and may not access service providers with the low predicted delivery experience value, and thus the user experience can be improved.

In some embodiments, the processor 120 may determine whether to filter out the part of the second list of service providers to produce the third list of service providers as the search result, based on a size of the second list of service providers. In some embodiments, if the processor 120 determines to filter out the part of the second list of service providers, the processor 120 may filter out the part of the second list of service providers based on the predicted delivery experience value of each service provider in the second list of service providers, to produce the third list of service providers.

In some embodiments, the processor 120 may rank the second list of service providers based on a plurality of predetermined second factor values, and produce the third list of service providers from the second list of service providers further based on the rank of each service provider in the second list of service providers.

In some embodiments, if the size of the second list of service providers is less than a predetermined size, the processor 120 may determine not to filter out the part of the second list of service providers to produce the third list of service providers. For example, if the size of the third list of service providers is too small, it may affect a conversion rate of the search and there may be no enough option provided to the user 160.

In some embodiments, if the size of the second list of service providers is same as or greater than the predetermined size, the processor 120 may determine to filter out the part of the second list of service providers based on the rank of each service provider in the second list of service providers, to produce the third list of service providers. For example, the processor 120 may filter out the last M-percentile service providers (for example, "M" is a parameter to be optimised), so that the service providers in the third list of service providers have higher predicted delivery experience value, while the conversion rate of the search may not be affected too much.

In some embodiments, if the size of the second list of service providers is same as or greater than the predetermined size, the processor 120 may filter out at least one service provider which has the predicted delivery experience value lower than a predetermined minimum threshold of the predicted delivery experience value. If most of the service providers in the second list of service providers have the low predicted delivery experience value during low supply conditions (for example, heavy rain, peak hour, etc.), there may be a situation that the service providers with the low predicted delivery experience value may still be inside the third list of service providers. As the processor 120 uses the predetermined minimum threshold of the predicted delivery experience value to avoid this situation, the service providers included in the third list of service providers may not have the predicted delivery experience value lower than the predetermined minimum threshold of the predicted delivery experience value.

In some embodiments, if the size of the second list of service providers is same as or greater than the predetermined size, the processor 120 may not filter out at least one service provider which has the predicted delivery experience value higher than a predetermined maximum threshold of the predicted delivery experience value. For example, when most of the service providers have high predicted delivery experience value, the processor 120 may determine that it is not necessary to filter out these service providers, as these service providers may not negatively affect the user experience.

In some embodiments, the processor 120 may use a mathematical equation as follows: filtering=relu(fedx$_{score}$−threshold(percentile,N$_{merchants}$,min$_{fedx}$,max$_{fedx}$)) wherein, N$_{merchants}$ is a size of the second list of service providers, min$_{fedx}$ and max$_{fedx}$ are configurations defined for each region (for example, a city) as the predetermined minimum threshold and the predetermined maximum threshold of the predicted delivery experience value, fedx$_{score}$ is the delivery experience value (score) predicted based on the FedX prediction model, percentile is a location in the second list of service providers where to obtain the delivery experience value (score), and threshold is a threshold of the predicted delivery experience value for filtering. If the size of the second list of service providers is higher than the predetermined maximum threshold of the predicted delivery experience value, the processor 120 may not apply the filtering. The relu function may check whether the fedx$_{score}$ is higher than the threshold. If the fedx$_{score}$ is higher than the threshold, "1" may be returned, and the final ranking process may be operated based on other features. If the fedx$_{score}$ is same as or less than the threshold, the results with "0" value may be filtered out, and the service provider may not be shown to the user 160. An example of an algorithm of the relu function is as follows:

Check len(second list of service providers)>N$_{merchants}$
  If no, return 1
  If yes, get the FedX value at percentile of percentile in
    the second list of service providers (threshold)
  Threshold=max(threshold,min(threshold,max$_{fedx}$),
    min$_{fedx}$)
Return the threshold In some embodiments, the surge, which is one of the plurality of predetermined second factor values, may control delivery fees for the request for the on-demand service (order) based on real time market conditions to shape the demand. For example, if a supply of service contractors (drivers) is limited and a demand is high, the surge may increase to increase the delivery fees and to reduce the user's demand. In some embodiments, a surge signal may be passed to the final ranking process and optimised together with other features, such as the predicted delivery experience value, the profit, the revenue, etc. With the surge signal, the processor 120 may take the surge into consideration to rank the second list of service providers. As a result, for example, service providers with low surge may be ranked higher, and this may lead to increase the conversion rate of the search.

In some embodiments, the ETA padding may be an another lever to be considered to shape the demand. As the predicted ETA has some inaccuracy, users may prefer orders to be delivered on time or slightly earlier that the predicted ETA. In some embodiments, the processor 120 may add a value (referred to as a "padding value") to the estimated ETA to adjust the predicted ETA to improve the user's fulfilment. The padding value added to the predicted ETA may be tuned together with other levers to provide an improved demand shaping.

In some embodiments, the processor 120 may provide the third list of service providers to the computing device 161 as the search result. In some embodiments, the third list of service providers may be provided to the computing device 161 based on the final ranking score, together with the top N service providers (ranked between N and 2N) which are not passed to the final ranking process, as the search result. For example, there are total 200 service providers to be listed to the user, and 190 service providers pass to the final ranking process from the default ranking process and 10 service providers are filtered out during the final ranking process. If there are 180 service providers passed from the final ranking process, 20 service providers may be selected from the remaining service providers in the default ranking process (not passed to the final ranking process). As a result, the service providers shown to the user may include 180 service providers from ranks 1 to 190 (without 10 service providers filtered out) and 20 service providers from ranks 191 to 210.

As described above, to solve the above-mentioned problem, the server 100 in accordance with various embodiments may control the visibility of service providers based on more functions, such as the revenue, the profit, the conversion rate of the search, the popularity, the predicted delivery experience value, etc., instead of only using a radius management to control the visibility purely based on the delivery distance and surge of the delivery fees. The server 100 in accordance with various embodiments can consider the predicted delivery experience value and optimise multiple levers together. In this manner, the server 100 in accordance with various embodiments can control the visibility of the service providers, and thus shape the demand in an optimal manner.

FIG. 4 illustrates a flow diagram for a method 300 for processing a request for a search for an on-demand service according to various embodiments. According to various embodiments, the method 300 for processing the request for the search for the on-demand service may be provided.

In some embodiments, the method 300 may include a step 301 of receiving the request for the search for the on-demand service from a computing device.

In some embodiments, the method 300 may include a step 302 of determining a distance from a location of the computing device based on a confirmed allocation rate of a plurality of requests for on-demand services received from a plurality of users, to produce a first list of service providers within the distance.

In some embodiments, the method 300 may include a step 303 of ranking the first list of service providers based on a plurality of predetermined first factor values including a predicted delivery experience value of each service provider in the first list of service providers.

In some embodiments, the method 300 may include a step 304 of producing a second list of service providers from the first list of service providers based on the rank of each service provider in the first list of service providers.

In some embodiments, the method 300 may include a step 305 of determining whether to filter out a part of the second list of service providers to produce a third list of service providers, based on a size of the second list of service providers.

In some embodiments, the method 300 may include a step 306 of, if it is determined to filter out the part of the second list of service providers, filtering out the part of the second list of service providers based on the predicted delivery experience value of each service provider in the second list of service providers, to produce the third list of service providers.

In some embodiments, the method 300 may include a step 307 of providing the third list of service providers as a search result to the computing device.

Figure 5:
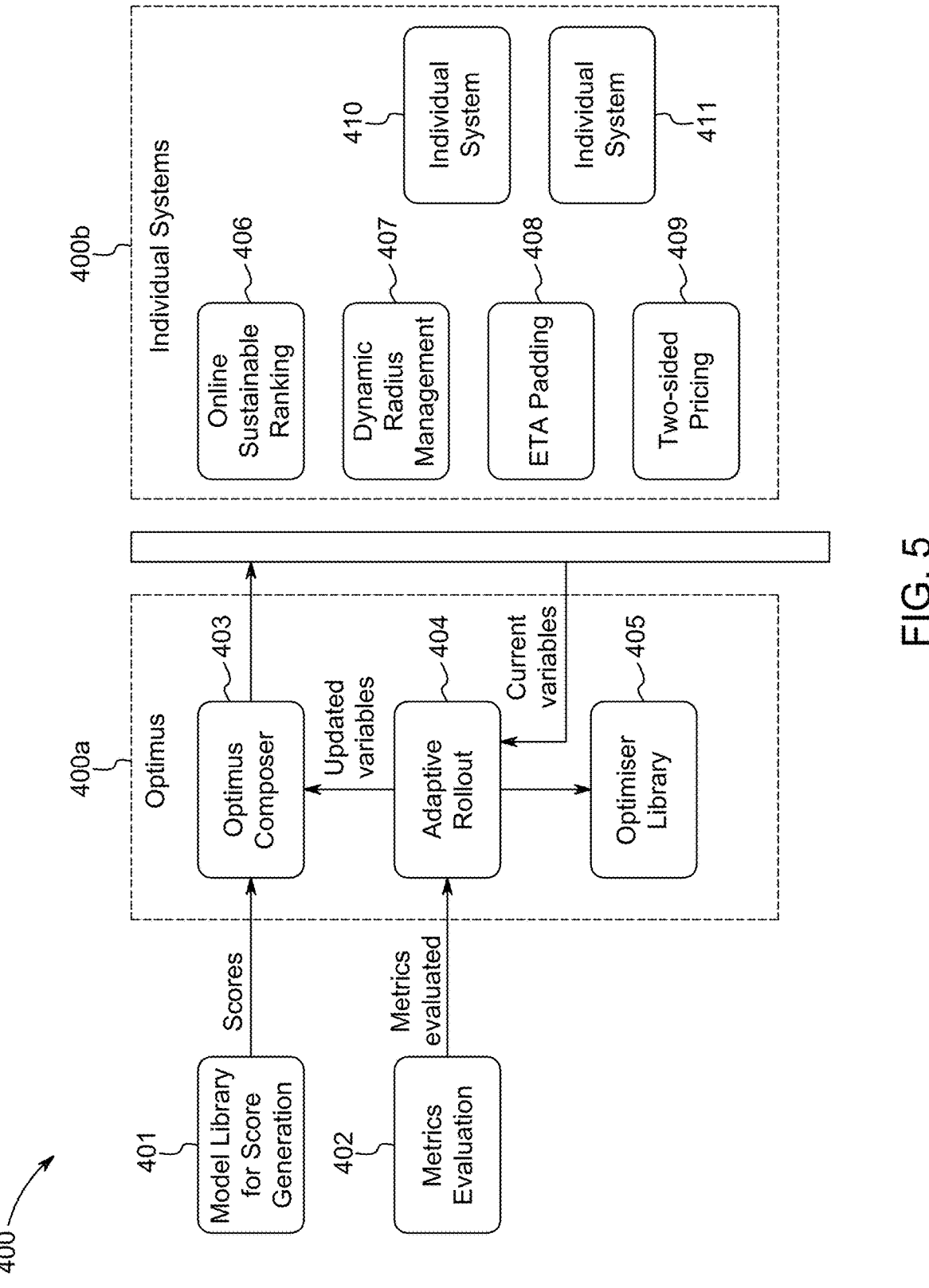
FIG. 5 illustrates a block diagram of a server for processing a request for a search for an on-demand service according to various embodiments.

FIG. 5 illustrates a block diagram of a server 400 for processing a request for a search for an on-demand service according to various embodiments.

In some embodiments, the server 400 may include an optimisation framework 400a and a general framework 400b. The optimisation framework 400a may support a multiple objective optimisation, to optimise multiple levers together within one optimisation system and find suitable parameters for them. The optimisation framework 400a may be referred to as Optimus 400a, and the general framework 400b may be referred to as individual systems 400b.

In some embodiments, as described above, the multiple levers may include, but are not limited to, five levers as follows: an automatic radius management (also referred to as an "ARM"), a default ranking, a final ranking, a surge, and an ETA padding. In some embodiments, there may be unknown parameters that need to be optimised. For example, the parameters may include, but are not limited to, percentile and $N_{merchants}$ in the final ranking process, weights of features in the default ranking process and the final ranking process, delivery radius parameters in the ARM, the surge signal, and the ETA padding parameter. In some embodiments, there may be parameters that exist in a conventional system, for example, weights of all the features, including a type, revenue, profit, matching score, etc. of each service provider. For example, the type of each service provider may include a merchant type.

As shown in FIG. 5, in some embodiments, the server 400 may include a model library 401 for score generation. The model may be an online service model to calculate ranking scores to rank the service providers. The model may include, but is not limited to, FedX score, ETA score, etc. In some embodiments, the server 400 may include a metrics evaluation module 402. The metrics evaluation module 402 may be a service pipeline to compute historical performance metrics based on stored historical data and configurations.

As shown in FIG. 5, in some embodiments, the optimisation framework 400a may include, but is not limited to, a composer 403 (also referred to as an "optimus composer"), an optimisation library 405 (also referred to as an "optimiser library"), and an adaptive rollout module 404. In some embodiments, the composer 403 may compose necessary features and configurations to update the weights and parameters for the levers. In some embodiments, the optimisation library 405 may have an optimisation logic, for example, a Bayesian optimiser, etc. In some embodiments, the adaptive rollout module 404 may analyse a historical performance for each configuration based on historical data and configurations, and apply the optimisation parameters to different layers through an adaptive rollout. The performance results may then be saved for future optimisation usage.

As shown in FIG. 5, in some embodiments, the general framework 400b may include an online sustainable ranking module 406. The online sustainable ranking module 406 may be one of the services onboarded to the Optimus platform (which is a platform performing the final ranking process). The online sustainable ranking module 406 may rank the service providers based on FedX performance, revenue, profit, popularity, etc.

In some embodiments, the general framework 400b may include a dynamic radius management module 407. The dynamic radius management module 407 may be another service onboarded to the Optimus platform. The dynamic radius management module 407 may be an automatic radius management service and used to control the delivery radius.

In some embodiments, the general framework 400b may include an ETA padding module 408. The ETA padding module 408 may be the service onboarded to the Optimus platform. The ETA padding module 408 may be used to control the estimated delivery time (ETA) shown on the user's software application (app).

In some embodiments, the general framework 400b may include a two-sided pricing module 409. The two-sided pricing module 409 may be another service onboarded to the Optimus platform. The two-sided pricing module 409 may be used to control delivery fees shown on the user's software application and the delivery fees earned by the service provider, and to manage the delivery fees based on different supply-demand conditions.

In some embodiments, general framework 400b may include additional individual system modules 410, 411.

Figure 6:
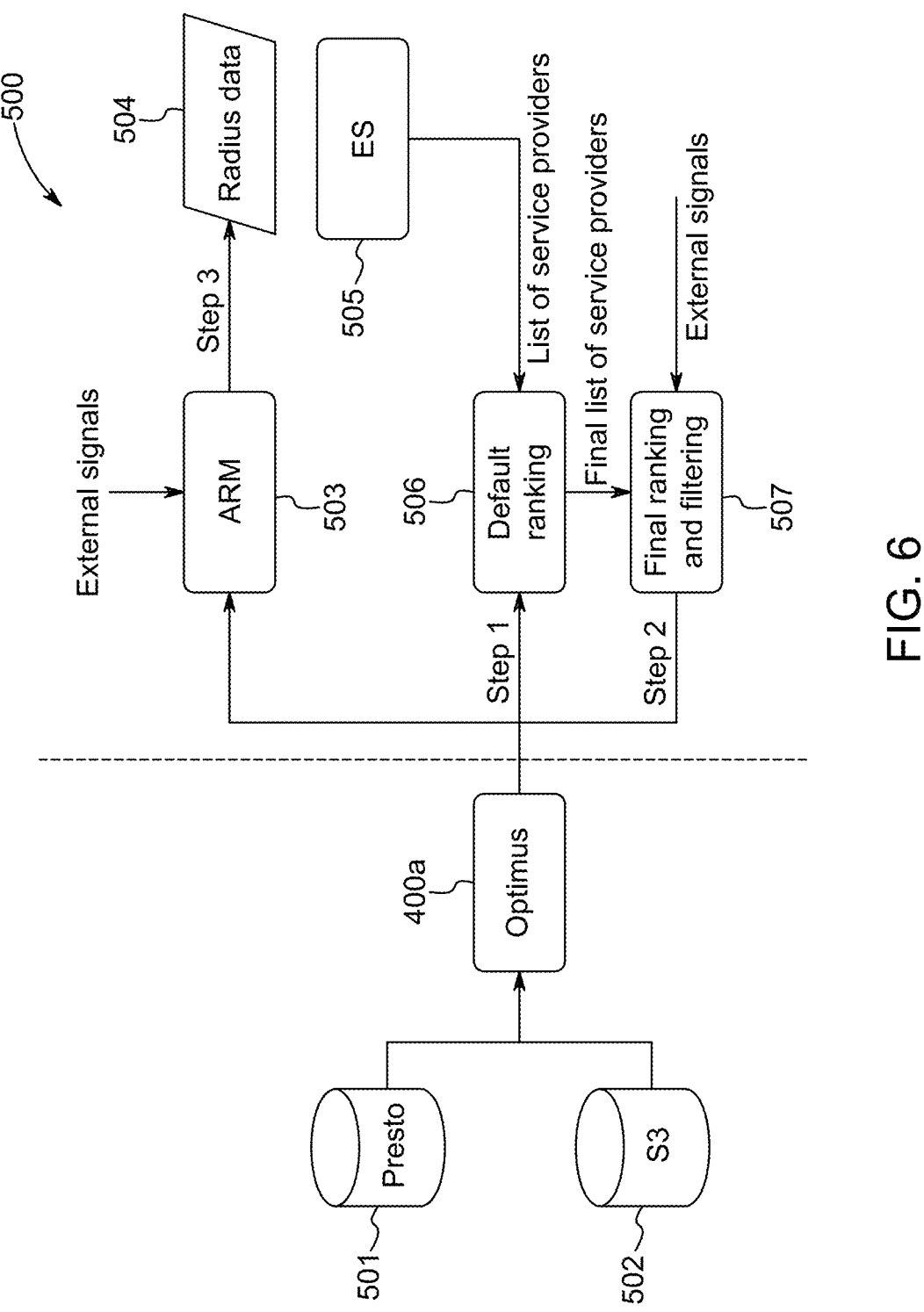
FIG. 6 illustrates a block diagram of a server for processing a request for a search for an on-demand service according to various embodiments.

FIG. 6 illustrates a block diagram of a server 500 for processing a request for a search for an on-demand service according to various embodiments.

In some embodiments, there is a Presto database 501 which is a Hive database which stores historical data including, not limited to, user behaviour data, browsing data, click data, checkout data, and order data. The order data may include whether the order is fulfilled, and the time to complete the order, etc.

In some embodiments, there is an S3 storage system 502 that stores all configurations used in the system. Historical configurations may be retrieved from the S3 storage system 502. The configurations and the historical data may be used to generate performance metrics.

In some embodiments, the optimisation framework 400a (also referred to as "Optimus") may control a visibility of service providers. In some embodiments, an ARM (also referred to as am "automatic radius management") module 503 may compute a delivery radius for a search, based on external signals including a CAR (also referred to as a "confirmed allocation rate"), and save the delivery radius data 504 into a database. In some embodiments, an ES (also referred to as an "elastic search") module 505 may read the delivery radius and apply to a search service. In some embodiments, after searching, a list of service providers is returned and passed to a default ranking module 506. The default ranking module 506 may rank the service providers based on a list of features including an FedX, and only top N (for example, N=100) merchants may be passed to a final ranking module 507. In some embodiments, in the final ranking module 507, a filtering logic as described above may be applied and service providers with high FedX performance may be kept. External signals including an ETA padding signal and a surge signal, etc. may be applied for ranking of the service providers.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A server for processing a request for a search for an on-demand service, the server comprising:

a communication interface configured to receive the request for the search for the on-demand service from a user via a computing device; and a processor connectable to the communication interface to receive the request for the search, compute historical performance metrics based at least on historical data associated with the user, wherein the historical data is retrieved from a database, determine a distance from a location of the computing device based on a confirmed allocation rate of a plurality of requests for on-demand services received from a plurality of users and at least one parameter optimized based on the computed historical performance metrics to produce a first list of service providers within the distance, wherein the processor is configured to use a FedX prediction model to predict a delivery experience value of each service provider in the first list of service providers based on at least one of (i) a historical delivery experience value of each service provider, (ii) an estimated time of arrival performance, and (iii) a real-time signal including a confirmed allocation rate, rank the first list of service providers based on a plurality of predetermined first factor values including the predicted delivery experience value of each service provider in the first list of service providers, produce a second list of service providers from the first list of service providers based on the rank of each service provider in the first list of service providers, and determine whether to filter out a part of the second list of service providers to produce a third list of service providers, based on a size of the second list of service providers, and if the processor determines to filter out the part of the second list of service providers, the processor is configured to use a detailed FedX prediction model to filter out the part of the second list of service providers based on the predicted delivery experience value of each service provider in the second list of service providers to produce the third list of service providers, and provide the third list of service providers as a search result to the computing device via the communication interface.

2. The server according to claim 1, wherein the processor is configured to filter out a part of the first list of service providers based on the rank of each service provider in the first list of service providers, to produce the second list of service providers.

3. The server according to claim 1, wherein the processor is configured to rank the second list of service providers based on a plurality of predetermined second factor values, and produce the third list of service providers from the second list of service providers based on the rank of each service provider in the second list of service providers.

4. The server according to claim 3, wherein if the size of the second list of service providers is less than a predetermined size, the processor is configured to determine not to filter out the part of the second list of service providers to produce the third list of service providers.

5. The server according to claim 3, wherein if the size of the second list of service providers is same as or greater than the predetermined size, the processor is configured to determine to filter out the part of the second list of service providers based on the rank of each service provider in the second list of service providers, to produce the third list of service providers.

6. The server according to claim 5, wherein if the size of the second list of service providers is same as or greater than the predetermined size, the processor is configured to filter out at least one service provider which has the predicted delivery experience value lower than a predetermined minimum threshold of the predicted delivery experience value.

7. The server according to claim 5, wherein if the size of the second list of service providers is same as or greater than the predetermined size, the processor is configured not to filter out at least one service provider which has the predicted delivery experience value higher than a predetermined maximum threshold of the predicted delivery experience value.

8. The server according to claim 1, wherein the plurality of predetermined first factor values further includes at least one of a revenue, a profit, a type, and a searching matching score of each service provider in the first list of service providers.

9. The server according to claim 3, wherein the plurality of predetermined second factor values includes at least one of a surge, an estimated time of arrival, a revenue, a profit, and a type of each service provider in the second list of service providers.

10. A method for processing a request for a search for an on-demand service, the method comprising:
  receiving the request for the search for the on-demand service from a user via a computing device;
  computing historical performance metrics based at least on historical data associated with the user, wherein the historical data is retrieved from a database;
  determining a distance from a location of the computing device based on a confirmed allocation rate of a plurality of requests for on-demand services received from a plurality of users and at least one parameter optimized based on the computed historical performance metrics to produce a first list of service providers within the distance;
  using a FedX prediction model to;
    predict a delivery experience value of each service provider in the first list of service providers based on at least one of (i) a historical delivery experience value of each service provider, (ii) an estimated time of arrival performance, and (iii) a real-time signal including a confirmed allocation rate;
    rank the first list of service providers based on a plurality of predetermined first factor values including the predicted delivery experience value of each service provider in the first list of service providers;
    produce a second list of service providers from the first list of service providers based on the rank of each service provider in the first list of service providers; and
    determine whether to filter out a part of the second list of service providers to produce a third list of service providers, based on a size of the second list of service providers;

if it is determined to filter out the part of the second list of service providers, using a detailed FedX prediction model to;
    filter out the part of the second list of service providers based on the predicted delivery experience value of each service provider in the second list of service providers, to produce the third list of service providers; and
    provide the third list of service providers as a search result to the computing device.

11. The method according to claim 10 further comprising: filtering out a part of the first list of service providers based on the rank of each service provider in the first list of service providers, to produce the second list of service providers.

12. The method according to claim 10 further comprising:
    ranking the second list of service providers based on a plurality of predetermined second factor values; and
    producing the third list of service providers from the second list of service providers based on the rank of each service provider in the second list of service providers.

13. The method according to claim 12 further comprising: if the size of the second list of service providers is less than a predetermined size, determining not to filter out the part of the second list of service providers to produce the third list of service providers.

14. The method according to claim 12 further comprising: if the size of the second list of service providers is same as or greater than the predetermined size, determining to filter out the part of the second list of service providers based on the rank of each service provider in the second list of service providers, to produce the third list of service providers.

15. The method according to claim 14, wherein if the size of the second list of service providers is same as or greater than the predetermined size, at least one service provider which has the predicted delivery experience value lower than a predetermined minimum threshold of the predicted delivery experience value is filtered out.

16. The method according to claim 14, wherein if the size of the second list of service providers is same as or greater than the predetermined size, at least one service provider which has the predicted delivery experience value higher than a predetermined maximum threshold of the predicted delivery experience value is not filtered out.

17. The method according to claim 10, wherein the plurality of predetermined first factor values further includes at least one of a revenue, a profit, a type, and a searching matching score of each service provider in the first list of service providers.

18. The method according to claim 12, wherein the plurality of predetermined second factor values includes at least one of a surge, an estimated time of arrival, a revenue, a profit, and a type of each service provider in the second list of service providers.

19. A data processing apparatus configured to perform the method of claim 10.

20. A non-transitory computer-readable medium comprising program instructions, which, when executed by one or more processors, cause the one or more processors to perform the method of claim 10.

* * * * *